(12) United States Patent
Masini

(10) Patent No.: US 9,038,241 B2
(45) Date of Patent: May 26, 2015

(54) HINGE IN COMPOSITE MATERIAL AND PROCESS FOR ITS MANUFACTURE

(71) Applicant: AUTOMOBILI LAMBORGHINI S.P.A, Sant'Agata Bolognese BO (IT)

(72) Inventor: Attilio Masini, Monteveglio BO (IT)

(73) Assignee: AUTOMOBILI LAMBORGHINI S.P.A, Sant'Agata Bolognese BO (IT)

( * ) Notice: Subject to any disclaimer, the term of this patent is extended or adjusted under 35 U.S.C. 154(b) by 0 days.

(21) Appl. No.: 14/386,202

(22) PCT Filed: Apr. 10, 2013

(86) PCT No.: PCT/IB2013/052847
§ 371 (c)(1),
(2) Date: Sep. 18, 2014

(87) PCT Pub. No.: WO2013/153520
PCT Pub. Date: Oct. 17, 2013

(65) Prior Publication Data
US 2015/0047151 A1    Feb. 19, 2015

(30) Foreign Application Priority Data

Apr. 13, 2012 (IT) .............................. MI2012A0604

(51) Int. Cl.
*E05D 1/00* (2006.01)
*E05D 1/02* (2006.01)
(Continued)

(52) U.S. Cl.
CPC ............... *E05D 1/02* (2013.01); *E05Y 2800/68* (2013.01); *B29L 2031/22* (2013.01); *B29C 70/86* (2013.01); *B29C 70/30* (2013.01); *B29C 65/70* (2013.01); *B29K 2061/04* (2013.01); *B29K 2105/089* (2013.01)

(58) Field of Classification Search
CPC ......... Y10T 16/525; Y10S 16/13; E05D 1/00; E05D 1/02; E05D 9/005; E05D 7/00; E05Y 2800/68; B29L 2031/22; B29C 51/00; B29C 65/70; B29C 65/30; B29K 2105/06; B29K 2105/089
USPC ............. 16/225, 372, DIG. 13; 428/171, 172, 428/174, 57–62, 323, 325, 327; 264/171.1, 264/171.21, 250–252, 242, 257, 275, 241, 264/274; 29/11
See application file for complete search history.

(56) References Cited

U.S. PATENT DOCUMENTS 2,201,968 A * 5/1940 Fischer ........................... 16/372
3,222,437 A * 12/1965 Schilling ......................... 264/54
(Continued)

FOREIGN PATENT DOCUMENTS

EP    1738895    1/2007
WO   2012035465   3/2012

*Primary Examiner* — Chuck Mah
(74) *Attorney, Agent, or Firm* — Lucas & Mercanti, LLP

(57) ABSTRACT

Disclosed is a hinge having a rigid portion integral with a flexible portion suitable to be bent with respect to the rigid portion, wherein the rigid portion has a substrate in a rigid composite material and the flexible portion has a first flexible sheet, wherein a first portion of the first flexible sheet is joined at least partially to the substrate by means of at least one first layer of resin for composite materials, wherein the flexible portion also has a second flexible sheet joined at least partially by means of at least one second layer of resin for composite materials both to the first portion of the first flexible sheet and to at least one second portion of the first flexible sheet which is not joined to the substrate.

24 Claims, 2 Drawing Sheets

(51) Int. Cl.
  *B29C 70/86* (2006.01)
  *B29C 70/30* (2006.01)
  *B29C 65/70* (2006.01)
  *B29L 31/22* (2006.01)
  *B29K 61/04* (2006.01)
  *B29K 105/08* (2006.01)

(56) References Cited

U.S. PATENT DOCUMENTS

| | | | | |
|---|---|---|---|---|
| 3,445,052 A | * | 5/1969 | Lewallen | 428/158 |
| 4,809,402 A | * | 3/1989 | Rainville | 16/372 |
| 4,885,820 A | * | 12/1989 | Erceg et al. | 16/225 |
| 4,923,741 A | * | 5/1990 | Kosmo et al. | 442/187 |
| 5,350,614 A | * | 9/1994 | Chase et al. | 428/53 |
| 5,463,794 A | * | 11/1995 | Erland | 16/225 |
| 5,707,474 A | * | 1/1998 | Andersen et al. | 156/257 |
| 5,945,053 A | * | 8/1999 | Hettinga | 264/171.13 |
| 6,334,235 B2 | * | 1/2002 | Duperray et al. | 16/225 |
| 6,630,094 B2 | * | 10/2003 | Abramson et al. | 264/491 |
| 6,936,321 B2 | * | 8/2005 | Moran et al. | 428/53 |
| 2004/0058182 A1 | * | 3/2004 | Strait | 428/542.8 |
| 2004/0266502 A1 | * | 12/2004 | Holtorf et al. | 455/899 |
| 2006/0240235 A1 | * | 10/2006 | Boutghrit et al. | 428/292.1 |
| 2007/0000091 A1 | * | 1/2007 | Priegelmeir et al. | 16/372 |
| 2011/0177279 A1 | * | 7/2011 | Casteras | 428/53 |
| 2012/0176736 A1 | * | 7/2012 | Apgar et al. | 361/679.01 |
| 2014/0007377 A1 | * | 1/2014 | Masini et al. | 16/225 |

* cited by examiner

HINGE IN COMPOSITE MATERIAL AND PROCESS FOR ITS MANUFACTURE

CROSS-REFERENCE TO RELATED APPLICATIONS

This application is a 371 of PCT/IB2013/052847, filed Apr. 10, 2013, which claims the benefit of Italian Patent Application No. MI2012A000604, filed Apr. 13, 2012, the contents of each of which are incorporated herein by reference.

FIELD OF THE INVENTION

Background of the Invention

The present invention relates to a hinge made of composite material, in particular a hinge which may be fixed or integrated into two parts in composite material that must be connected to each other in a rotary manner. The present invention also relates to a process for manufacturing such a hinge.

EP 1738895 describes a binge comprising two groups of layers of carbon fibers impregnated with epoxy resin, which layers are arranged on and under a substrate of aramid fibers impregnated with a poly' urethane resin. Said known hinge is complex and expensive to manufacture, as it requires layers of pre-impregnated fibers.

To solve said problem WO 2012035465 describes a hinge comprising two groups of layers of fibers arranged on and under two opposite edges of a substrate of material flexible and compatible for adhesion with resins for composite materials, so that a central portion of the substrate is not covered by these layers, wherein the substrate and the layers are embedded in a cured and flexible resin.

The hinges of EP 1738895 and WO 2012035465 have a relatively clear and sudden fold line between a rigid portion and a flexible portion. If deformed, these known hinges have a very accentuated edge between the two portions, with consequent problems of stress concentration and therefore of rapid wear.

Another problem of such known hinges is represented by their aesthetic finish, since it is not possible to carry out a product in which the two portions appear to be well-defined, almost isolated from each other.

SUMMARY OF THE INVENTION

The object of the present invention is therefore to provide a hinge free from said drawbacks. Said object is achieved with a hinge and a manufacturing process whose main features are specified in the claims.

Thanks to its particular layered structure, the hinge according to the present invention allows to obtain a flexible portion having a flexural rigidity variable according to the distance from the rigid portion, so as to obtain a hinge relatively more resistant and more versatile than the known hinges. Such resistance can be considerably increased by applying particular layers of reinforcing fibers on the substrate and on the flexible sheets, in particular on holes made in these flexible sheets, so that the latter are "pinched" in the rigid portion of the hinge. The flexural rigidity of the flexible portion can be controlled easily by overlapping the flexible sheets with appropriate arrangements and dimensions.

The aesthetic finish of the hinge is improved thanks to the clear and clean interface between the rigid portion and the flexible portion, which may be accentuated by a slit arranged between these portions.

The substrate of the rigid portion is preferably provided with a particular bevel which facilitates the deployment of the flexible sheets and make less sharp the interface between the rigid portion and the flexible portion of the hinge. On the other hand, it is possible to accentuate this interface by leaving a non-beveled portion on the edge of the substrate and/or by arranging this edge beside a particular rib formed on the mold for the manufacture of the hinge, which rib prevents the passage of resin from the rigid portion the flexible portion.

The substrate described in the Italian patent application MI2012A000307 and fabrics of carbon fiber described in the Italian patent applications MI412012A000244 and MI2012A000245 are particularly suitable for the application in the present hinge.

The hinge can be manufactured with a particular process that is fast and easy to carry out, especially if layers of fibers pre-impregnated with resin are employed as reinforcement layers.

BRIEF DESCRIPTION OF THE DRAWINGS

Further advantages and characteristics of the hinge and of the process according to the present invention will become apparent to those skilled in the art from the following detailed and non-limiting description of some of their embodiments with reference to the attached drawings in which.

DETAILED DESCRIPTION OF THE INVENTION

Figure 1:
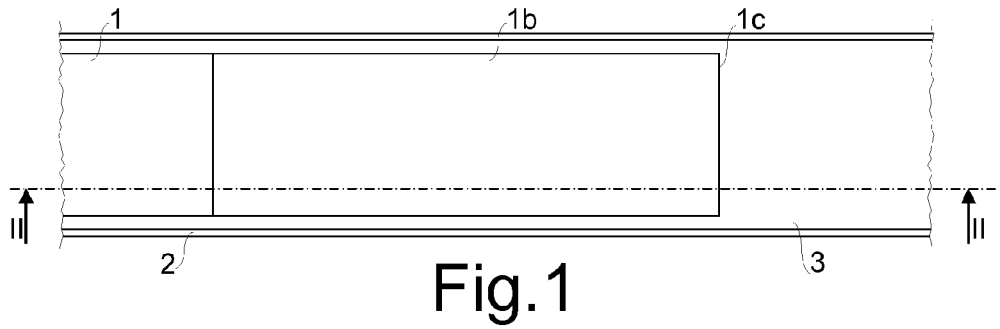
FIG. 1 shows a top view of a first embodiment of the hinge during a first step of the process.
Figure 2:
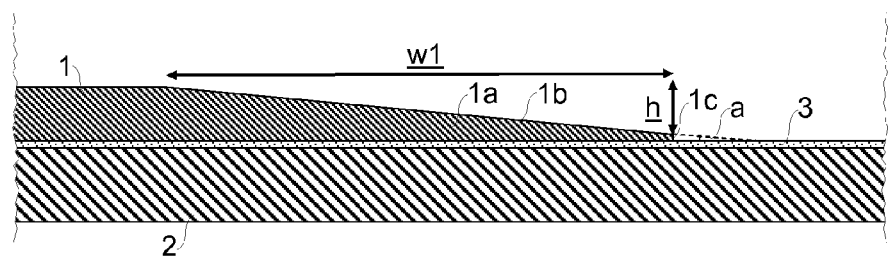
FIG. 2 shows the section II-II of FIG. 1.

Referring to FIGS. 1 and 2, it is seen that in a first step of the process at least one substrate 1, in particular having a substantially prismatic shape, of rigid composite material is arranged on at least one functional surface of a mold 2 for composite materials, A release sheet 3, known as peel-ply, may be arranged between mold 2 and substrate 1. The thickness of substrate 1 is greater than 1 mm, in particular comprised between 1 and 5 mm. An edge 1a of substrate 1 is provided with a bevel 1b on the opposite side to mold 2. Bevel 1b forms an angle a comprised between 1° and 45° with the surface of edge 1a of substrate 1 opposite to bevel 1b, i.e. the surface of substrate 1 in contact with mold 2, the width w1 of bevel 1b is comprised between 5 and 60 mm, and/or the height h of bevel 1b is comprised between 50% and 100% of the thickness of substrate 1. End 1c of edge to provided with bevel 1b preferably comprises also a non-beveled portion which has a height between 0.3 and 0.7 mm, in particular 0.5 mm, and is rounded or substantially perpendicular to the surface of substrate 1 in contact with mold 2.

Substrate 1 is preferably a sheet of CFRP (Carbon-Fiber-Reinforced Polymer) manufactured with a SMC (Sheet Molding Compound) process, as the product and the process described in Italian patent application MI2012A000307, which is incorporated herein by reference. In particular, substrate 1 is a sheet containing carbon fibers having a length between 5 and 50 mm and embedded in a random manner in a matrix of vinylester-phenolic resin that has already been cured. The flexural rigidity of substrate 1 is greater than 0.1 Nm/rad, in particular greater than 100 Nm/rad.

Figure 3:
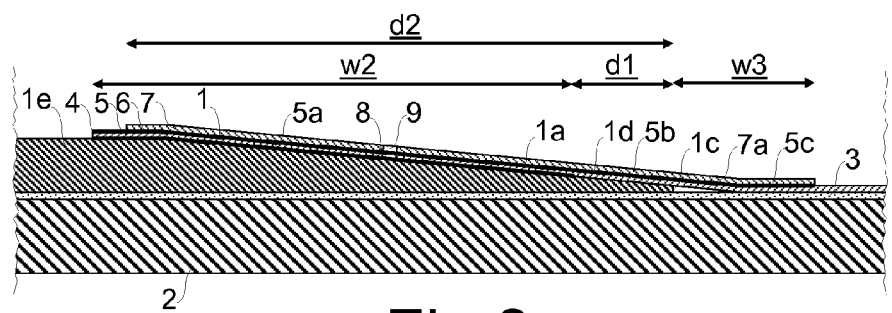
FIG. 3 shows the hinge of FIG. 2 during a second step of the process.

Referring to FIG. 3, it is seen that in a second step of the process at least one first layer 4 (indicated with a bold line) of resin for composite materials is applied on the surface of substrate 1 opposite to mold 2, so as to cover at least partially bevel 1b. Width w2 of the first resin layer 4 is comprised between 5 and 50 mm. The first resin layer 4 is applied onto edge in of substrate 1 so as to leave preferably uncovered by the first resin layer 4 a portion 1d of edge 1a adjacent to end 1c. Distance d1 between end 1c of edge 1a of substrate 1 and the first resin layer 4, i.e. the width of said uncovered portion 1d, is preferably comprised between 1 and 15 mm, in particular comprised between 3 and 5 mm.

A first flexible sheet 5 comprising fibers is arranged on mold 2, i.e. on the release sheet 3, and covers at least partially edge 1a of substrate 1, so that edge 1a of substrate 1 is comprised between mold 2 and the first flexible sheet 5. The first resin layer 4 is in turn comprised between substrate 1 and the first flexible sheet 5, which is, however, in direct contact with substrate 1 in said first portion 1d of edge 1a not covered by the first resin layer 4.

A second layer 6 (always indicated with a bold line) of resin for composite materials is applied onto the first flexible sheet 5, so that the two surfaces of at least one first portion 5a of the first flexible sheet 5 in contact with substrate 1 are provided respectively with the first resin layer 4 and/or the second resin layer 6. The second resin layer 6 is applied also on a second portion 5b of the first flexible sheet 5, having a width substantially equal to distance d1, which is adjacent to portion id of substrate 1 and is free form the first resin layer 4. The second resin layer 6 is applied also onto a third portion 5c of the first flexible sheet 5 which is in contact with mold 2 or with release sheet 3, namely protrudes beyond edge 1a of substrate 1.

A second flexible sheet 7 comprising fibers is arranged at least partially on the first flexible sheet 5, so that at least one portion of the second resin layer 6 is comprised between the first flexible sheet 5 and the second flexible sheet 7. In the present embodiment the second flexible sheet 7 is entirely arranged on the first flexible sheet 5, however in an alternative embodiment a portion of the second flexible sheet 7 may extend beyond the first flexible sheet S and be arranged on a first portion le of substrate 1 adjacent to edge 1a, in which case the first resin layer 4 and/or the second resin layer 6 extend between the second flexible sheet 7 and the portion 1e of substrate 1 for joining the second flexible sheet 7 to substrate 1. Distance d2 between end 1c of edge 1a of substrate 1 and the end of the edge of the second flexible sheet 7 arranged on substrate 1 is greater than 5 mm, in particular comprised between 5 and 50 mm, more in particular comprised between 15 and 25 mm. A portion 7a of the second flexible sheet 7 is joined to the third portion 5c of the first flexible sheet 5 by means of the second resin layer 6. Width w3 of said portion 7a is greater than 2 mm, in particular comprised between 3 and 30 mm, more particularly between 3 and 5 mm.

The first flexible sheet 5 and/or the second flexible sheet 7 are preferably provided with one or more holes 8, 9, wherein a hole 8 of the first flexible sheet 5 is arranged at least partially on a hole 9 of the second flexible sheet 7. Holes 8, 9 preferably lead onto bevel 1b of substrate 1 and are preferably made on the flexible sheets 5, 7 before the latter are arranged onto substrate 1.

In another embodiment, one or more further flexible sheets (not shown in the figure) comprising fibers, which may be provided with further holes arranged on holes 8, 9, may be arranged one above the other on the first flexible sheet 5, on the second flexible sheet 7 and/or on substrate 1, at least one layer of resin for composite materials being applied between two adjacent flexible sheets.

Figure 4:
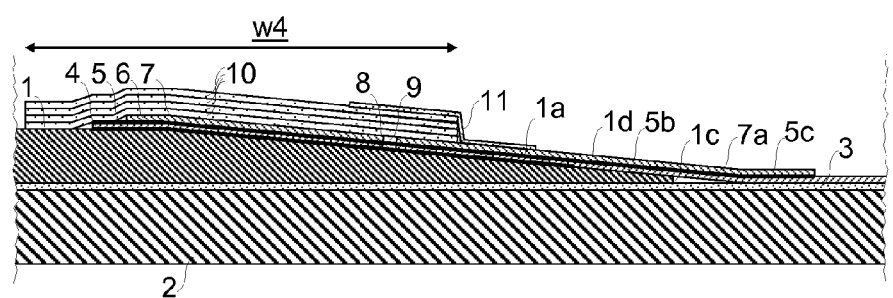
FIG. 4 shows the hinge of FIG. 2 during a third step of the process.

Referring to FIG. 4, it is seen that in a third step of the process one or more layers 10 of fibers preferably impregnated with a resin which is not yet cured, also known as pre-preg layers, are arranged onto substrate 1, onto the first flexible sheet 5, onto the second flexible sheet 7 and/or onto any further flexible sheets arranged on the first flexible sheet 5 and/or on the second flexible sheet 7, so as to cover holes 8, 9. The first flexible sheet 5 and the second flexible sheet 7 are then comprised between substrate 1 and the fibers layers 10. In particular, four layers 10 of impregnated carbon fibers having a thickness comprised between 0.1 and 1 mm, in particular between 0.2 and 0.4 mm, and substantially the same shape are arranged at least partially one on the other on substrate 1, the first flexible sheet 5 and the second flexible sheet 7. Width w4 of layers 10 of impregnated carbon fibers is comprised between 20 and 50 mm.

A sealing tape 11 is preferably applied onto an edge of the upper layer of fibers 10 and onto the upper flexible sheet, in particular the second flexible sheet 7, to create a barrier to the resin of layers 10.

In a subsequent step of the process, not shown in the figures, mold 2 provided with substrate 1, the flexible sheets 5, 7 and layers 10 of impregnated fibers is sealed in a vacuum bag and introduced into an autoclave, in which it is subjected to a pressure comprised between 3 and 6 bar and to a temperature comprised between 100 and 120° C. for a time comprised between 1 and 3 hours, so as to cure the first resin layer 4, the second resin layer 6 and the resin of layers 10 of impregnated fibers.

Figure 5:
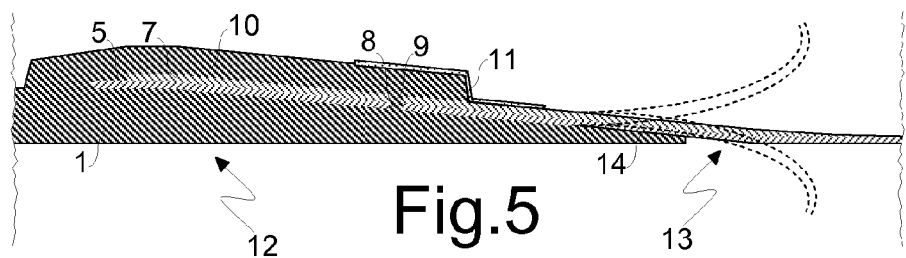
FIG. 5 shows the hinge of FIG. 2 at the end of the process.

Referring to FIG. 5, it is seen that at the end of the process said whole, once extracted from the autoclave, cooled and separated from mold 2 and from the release sheet 3, comprises a rigid portion 12 corresponding to substrate 1 and to the portion of the flexible sheets 5, 7 joined in one piece to substrate 1 by means of the resin layers 4, 6. The rigid portion 12 is thus integral with a flexible portion 13 corresponding to the portion of the flexible sheets 5, 7 which is not joined to substrate 1 and can be bent with respect to the rigid portion 12 as indicated by the dashed lines. The flexural rigidity in a section of the flexible portion 13, namely the radius of curvature in this section when the flexible portion 13 is bent, is inversely proportional to its distance from the rigid portion 12. Substrate 1 forms a single piece also with layers 10 of impregnated fibers both through the portion of these layers which are joined to substrate 1 and through the resin that has penetrated into holes 8, 9 of the flexible sheets 5, 7. A slot 14 is arranged between the rigid portion 12 and the flexible portion 13, namely between portion 5b of the first flexible sheet 5 not provided with the first resin layer 4 and portion 1d adjacent to end 1c of edge 1a of substrate 1.

Figure 6:
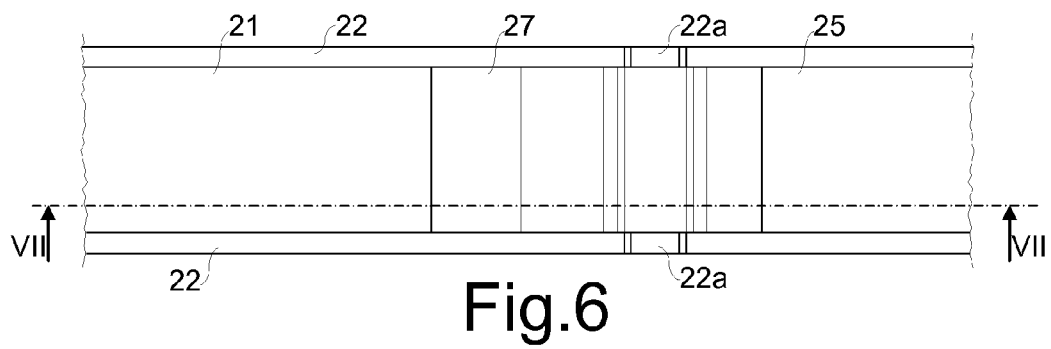
FIG. 6 shows a top view of a second embodiment of the hinge during a step of the process.
Figure 7:
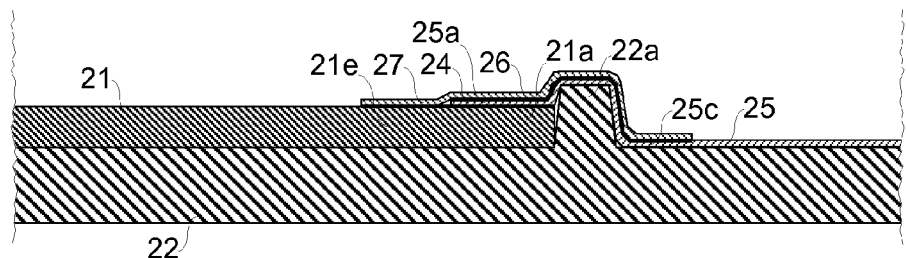
FIG. 7 shows the section VII-VII of FIG. 6.

Referring to FIGS. 6 and 7, it is seen that in a second embodiment, similar to the first embodiment if not disclosed and/or shown otherwise, at least one edge 21a of a substrate 21 is arranged beside a rib 22a which protrudes from the functional surface of a mold 22. Rib 22a presents a substantially prismatic shape with a trapezoidal section, with base angles comprised between 80° and 90°. The height of rib 22a is preferably greater than the thickness of substrate 21. A portion 25a of a first flexible sheet 25 is applied onto substrate 21 by means of at least one first resin layer 24 which covers the surface of edge 21a of substrate 21 opposite to mold 22 up to its end adjacent to rib 22a. The first flexible sheet 25 protrudes from edge 21a of substrate 21, overcomes rib 22a and continues on the functional surface of mold 22. A second flexible sheet 27 is applied onto the first flexible sheet 25 by means of a second resin layer 26 which covers the first flexible sheet 25 up to a portion adjacent to mold 22, i.e. arranged beyond rib 22a. Also the second flexible sheet 27 protrudes from edge 21a of substrate 21, overcomes rib 22a and continues on a second portion 25e of the first flexible sheet 25 arranged on the functional surface of mold 22. The second flexible sheet 27 covers portion 25a of the first flexible sheet 25 and a portion 21e of substrate 21 adjacent to its edge 21a. The second flexible sheet 27 is joined to portion 21e of substrate 21 by means of a layer of resin for composite materials, for example the first resin layer 24 which extends beyond edge 21a of substrate 21 toward portion 21e.

In a subsequent step of the process, not shown in the figures, mold 22 provided with substrate 21 and the flexible sheets 25, 27 is sealed in a vacuum bag and introduced into an autoclave to be subjected to a pressure comprised between 3 and 6 bar and to a temperature comprised between 100 and 120° C. for a time comprised between 1 and 3 hours, so as to cure the first resin layer 24 and the second resin layer 26.

Figure 8:
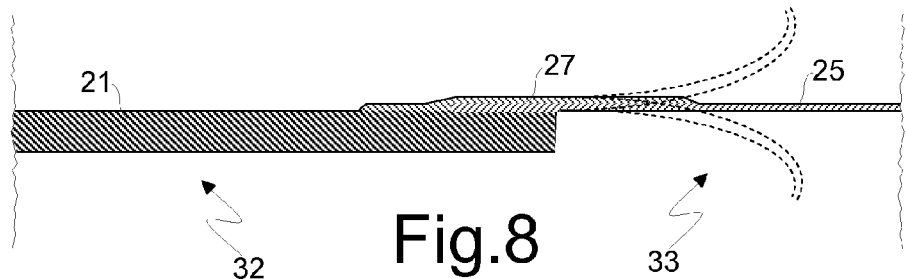
FIG. 8 shows the hinge of FIG. 7 at the end of the process.

Referring to FIG. 8, it is seen that at the end of the process such a whole, once extracted from the autoclave, cooled and separated from mold 22, comprises a rigid portion 32 corresponding to substrate 21 and to the portion of the flexible sheets 25, 27 joined to substrate 21. The rigid portion 32 firms a single piece with a flexible portion 33 corresponding to the portion of the flexible sheets 25, 27 that is not joined to substrate 21 and can be bent with respect to substrate 21 in the manner indicated by the dashed lines.

The thickness of the first resin layer 4, 24 and/or the second resin layer 6, 26 is comprised between 0.01 and 2 mm. The first resin layer 4, 24 and/or the second resin layer 6, 26 preferably comprise a thermosetting resin, in particular an epoxy resin such as the resin Cytec FM87-1.

The thickness of the first flexible sheet 5, 25 and/or of the second flexible sheet 7, 27 is comprised between 0.1 and 0.5 mm, in particular comprised between 0.2 and 0.3 mm. The flexural rigidity of the first flexible sheet 5, 25 and/or of the second flexible sheet 7, 27 before the polymerization of resins 4, 6, 24, 26 is less than 0.1 Nm/rad.

The first flexible sheet 5, 25 and/or the second flexible sheet 7, 27 and/or any further flexible sheets preferably comprise a fabric of carbon fiber that can be dry, i.e. not impregnated with resins, or impregnated with resins which are flexible when cured. Said carbon fiber fabric is laminated with a polyurethane or acrylic film, as the fabric described in Italian patent application MI2012A000244 which is incorporated herein by reference, and/or is impregnated with a silicone or acrylic emulsion as the fabric described in the application Italian patent MI2012A000245 which is incorporated herein by reference.

It is obvious that the term hinge should be interpreted in the broadest sense of the present invention, given that the external profiles of substrate 1, 21 and the flexible sheets 5, 7, 25, 27 may have different shapes and sizes.

Possible variants and/or additions may be made by those skilled in the art to the embodiment of the invention here described and illustrated remaining within the scope of the following claims. In particular, further embodiments of the invention may include the technical features of one of the following claims with the addition of one or more technical features, taken individually or in any mutual combination, described in the text and/or illustrated in the drawings.

The invention claimed is:

1. Hinge comprising a rigid portion integral with a flexible portion suitable to be bent with respect to the rigid portion, wherein said rigid portion comprises a substrate in a rigid composite material and said flexible portion comprises a first flexible sheet, wherein a first portion of the first flexible sheet is joined at least partially to the substrate by means of at least one first layer of resin for composite materials, wherein said flexible portion also comprises a second flexible sheet joined at least partially by means of at least one second layer of resin for composite materials both to said first portion of the first flexible sheet and to at least one second portion of the first flexible sheet which is not joined to the substrate.

2. Hinge according to claim 1, wherein a portion of the second flexible sheet is joined to a portion of the substrate by means of at least one layer of resin for composite materials.

3. Hinge according to claim 1, wherein said at least one second portion of the first flexible sheet protrudes beyond an edge of the substrate.

4. Hinge according to claim 3, wherein a portion of the second flexible sheet is joined by means of at least one layer of resin for composite materials to said at least one second portion of the first flexible sheet.

5. Hinge according to claim 3, wherein the first flexible sheet is joined at least partially to a bevel made on said edge of the substrate.

6. Hinge according to claim 5, wherein the bevel forms an angle between 1° and 45° with the surface of the edge of the substrate opposite to the bevel, the width of the bevel is between 5 and 60 mm, and/or the height of the bevel is between 50% and 100% of the thickness of the substrate.

7. Hinge according to claim 5, wherein the end of the edge provided with the bevel comprises a non-beveled portion that has a height comprised between 0.3 and 0.7 mm, in particular 0.5 mm.

8. Hinge according to claim 3, further comprising a slit of the first flexible sheet and a portion adjacent the end of said edge of the substrate.

9. Hinge according to claim 1, wherein one or more further flexible sheets are arranged one on the other on the first flexible sheet, on the second flexible sheet and/or on the substrate, at least one layer of resin for composite materials being applied between two adjacent flexible sheets.

10. Hinge according to claim 1, wherein one or more of said flexible sheets are provided with one or more holes leading to the substrate.

11. Hinge according to claim 1, wherein said rigid portion comprises one or more layers of fibers which are joined in a single piece by means of cured resin to the substrate, to the first flexible sheet, to the second flexible sheet and/or to further flexible sheets, if any, arranged on the first flexible sheet and/or on the second flexible sheet, wherein the first flexible sheet and the second flexible sheet are comprised between the substrate and the layers of fibers.

12. Hinge according to claim 11, wherein one or more of said layers of fibers cover holes made in the first flexible sheet and/or in the second flexible sheet.

13. Hinge according to claim 11, wherein a sealing tape is applied on an edge of the upper layer of fibers and on the upper flexible sheet.

14. Hinge according to claim 1, wherein the flexural rigidity in a section of the flexible portion is inversely proportional to its distance from the rigid portion.

15. Hinge according to claim 1, wherein one or more of said layers of resin comprise a thermosetting resin.

16. Hinge according to claim 1, wherein one or more of said flexible sheets comprise a fabric of carbon fiber.

17. Hinge according to claim 16, wherein said carbon fiber fabric is laminated with a polyurethane or acrylic film and/or is impregnated with a silicone or acrylic emulsion.

18. Process for manufacturing a hinge, comprising the following steps:
- arranging a substrate of composite material on at least one functional surface of a mold;
- arranging a first flexible sheet on the substrate, wherein at least one first layer of resin for composite materials is arranged between a first portion of the first flexible sheet and the substrate;
- arranging a second flexible sheet both on said first portion of the first flexible sheet and on a second portion of the first flexible sheet, wherein at least one second layer of resin for composite materials is arranged between the second flexible sheet and said portions of the first flexible sheet and
- curing said layers of resin in order to obtain a rigid portion integral with a flexible portion suitable to be bent with respect to the rigid portion, wherein said rigid portion comprises the substrate and said flexible portion comprises the first flexible sheet and the second flexible sheet.

19. Process according to claim 18, wherein the first flexible sheet protrudes on the mold from an edge of the substrate.

20. Process according to claim 18, wherein at least one edge of the substrate is arranged beside a rib protruding from the functional surface of the mold.

21. Process according to claim 20, wherein the first flexible sheet protrudes from the edge of the substrate, overcomes the rib and continues on the functional surface of the mold.

22. Process according to claim 20, wherein the height of the rib is greater than the thickness of the substrate.

23. Process according to claim 18, wherein the first layer of resin and/or the second layer of resin are applied onto the first flexible sheet and/or the second flexible sheet, respectively, when the latter are already arranged on the substrate and/or onto the first flexible sheet arranged on the mold, respectively.

24. Process according to claim 18, wherein the first flexible sheet and/or the second flexible sheet are provided with one or more holes before they are arranged onto the substrate and/or onto the first flexible sheet arranged on the mold, respectively.

* * * * *